Oct. 24, 1967  F. H. BLAKE  3,349,334
TIMING CIRCUITRY
Filed Oct. 22, 1965  10 Sheets-Sheet 1

FIG. 1.

INVENTOR.
FREDERICK H. BLAKE
BY
Schapp & Hatch
ATTORNEYS

INVENTOR.
FREDERICK H. BLAKE
BY
Schapp & Hatch
ATTORNEYS

Oct. 24, 1967   F. H. BLAKE   3,349,334
TIMING CIRCUITRY

Filed Oct. 22, 1965   10 Sheets-Sheet 4

INVENTOR.
FREDERICK H. BLAKE
BY
Schupp & Hatch
ATTORNEYS

United States Patent Office 3,349,334
Patented Oct. 24, 1967

3,349,334
TIMING CIRCUITRY
Frederick H. Blake, Los Altos, Calif., assignor to Michael
J. Sobyro and Anna M. Sobyro, both of Chicago, Ill.
Filed Oct. 22, 1965, Ser. No. 501,801
9 Claims. (Cl. 328—71)

ABSTRACT OF THE DISCLOSURE

This invention provides timing circuitry suitable for controlling sequential operation in machinery in a rapid, accurate and failsafe manner, the timing circuitry comprising a flip-flop having two stable states of operation with one state providing a signal suitable to operate the machinery when the circuitry is turned on by providing a sequence of signals, one dependent upon the other, with said signals operating directly or through time delay mechanisms to provide timed signals for operating the mechanism in time sequence, and with said signals feeding back to the flip-flop to change its position from the first stage to the second stage where another signal is sent out through time delay mechanisms to provide further signals and re-set the flip-flop back to its first stage of operation, these signals being interrelated so that failure of any single signal will stop the whole operation to provide a failsafe condition.

---

This application is a continuation-in-part of my co-pending application Serial No. 249,969, filed Dec. 31, 1962, entitled, Molding Machines, now Patent No. 3,213,486, issued Oct. 26, 1965, and relates to improvements in timing circuitry and more particularly to control circuits for machines adapted for forming food products and the like into a desired shape on a stick-like handle.

The usefulness of such machines to food processors lies in their ability to carry out the preparatory operations on the food product in a rapid, efficient and foolproof manner, requiring a minimum of handling.

Applicant has found that the requirements for high production speed and precise control of the time sequence of operation of the steps in such machines make electronic timing and control circuits highly desirable. For example, the timing of one step in the sequence of operations of such a machine can be used to determine the amount of food material formed into each unit of the final product. Food processors are compelled by minimum weight laws to err, if at all, on the side of excess, so that precise control of the amount of the material in the finished product, to closely approach but not drop below the required amount, can reduce the excess to a minimum and thereby increase the meat packer's profit.

The meat forming machine described in my above-mentioned co-pending application produces molded meat products in a cyclic series of operations, which includes such steps as mold closure, product valving, metering and injection, stick alignment and driving, and the ejection and counting of the finished product, and repeats such steps at rates up to several times per second. In such a situation, it is highly desirable that the timing and control circuit be made failsafe by making each timing step dependent upon the preceding timing steps, so that the machine will halt upon malfunction in one of the process steps, rather than go through its cycle repeatedly, committing an error each time. It is also desirable to have the machine complete a full cycle each time a cycle is begun unless some malfunction occurs to interrupt the cycle. Thus, the machine will not be left with the molds closed and charged with food or with a stick partially driven should operation of the machine be terminated by triggering the stop switch.

One of the primary reasons for employing such automated meat forming equipment by meat processors and packers is the decrease in the number of personnel required for a given amount of production. A machine intended to successfully replace the human element in production should cost less per unit production than the employment of human labor for the purpose, and must be both highly reliable and easy to service should a malfunction occur. It is also desirable that the timing and control circuit of such a machine be designed for flexibility and adaptation to use with a variety of input sensors, including such low current sensing devices as magnetic reed relays.

It is therefore a principal object of the present invention to provide a timing circuit for generating a sequence of signals suitable for governing the operation of an automatic molding machine for ground meat food products formed on a stick-like handle.

Another object of the present invention is to provide a timing circuit of the character described which is rendered failsafe through actuation of each timing step by the steps preceding it.

A further object of the present invention is to provide a timing circuit of the character described which completes each cycle once the cycle is begun, unless a malfunction occurs.

A still further object of the present invention is to provide a timing and control circuit of the character described in which the duration of certain of the control signals produced by that circuit is readily and reliably adjustable independently of the duration of the other control signals produced by the circuit.

Another object of the present invention is to provide a timing and control circuit of the character described which is sufficiently flexible in design to permit adaptation for use with a wide variety of input sensors and is of sufficiently high sensitivity to permit use of low-current sensing devices.

Yet another object of the present invention is the provision of a timing and control circuit of the character described which is inexpensive and simple in construction, inherently reliable and stable, has few service problems, and which is easy to service should malfunction occur.

Another object of the present invention is to provide a molding machine of the character described in which the cycle of operation is effected by actuating the various components in sequentially occurring periods of adjustable duration from a central control means including a timing and control circuit of the character described.

Still another object of the invention is the provision of a control means for a molding machine of the character set forth in which the quantity of food product injected into the mold cavity may be precisely controlled by an adjustable timing circuit effective for regulating the duration of time during which the food product is being fed into the mold cavity.

Another object of the invention is the provision of a control means of the character described which consists of switching circuits interconnected in a manner insuring that the operating elements of the machine are actuated in desired sequence throughout periods of time sufficient for the assigned function of each element to take place, the length of these periods being controlled by adjustable time delay devices incorporated in the switching circuits.

Further objects and advantages of my invention will be apparent as the specification progresses, and the new and useful features of my timing circuitry will be fully defined in the claims attached hereto.

The preferred form of my invention is illustrated in the accompanying drawings forming part of the specification, in which.

While I have shown only the preferred form of my invention, it should be understood that various changes or modifications may be made within the scope of the claims attached hereto without departing from the spirit of the invention.

Referring to the drawings in detail, it will be seen that the timing circuit of the present invention basically comprises a flip-flop 211 having two stable states of operation, a first signal control means 212 coupled to flip-flop 211 and adapted to provide first and second control signals upon activation of flip-flop 211 to its first stable state and to terminate the first control signal upon activation of flip-flop 211 to its second stable state, a second signal control means 213 operable to terminate the second control signal after a predetermined time delay, a third signal control means 214 providing a third control signal after a predetermined time delay in response to the first control signal, a fourth signal control means 216 providing a fourth control signal after a predetermined time delay in response to the third control signal, and a fifth signal control means 217 providing a fifth control signal after a first predetermined time delay in response to activation of the second stable state of the flip-flop 211 and terminating the fifth control signal after a second predetermined time delay. Fifth signal control means 217 also provides a recycle signal to flip-flop 211 after the second predetermined time delay.

Figure 13:
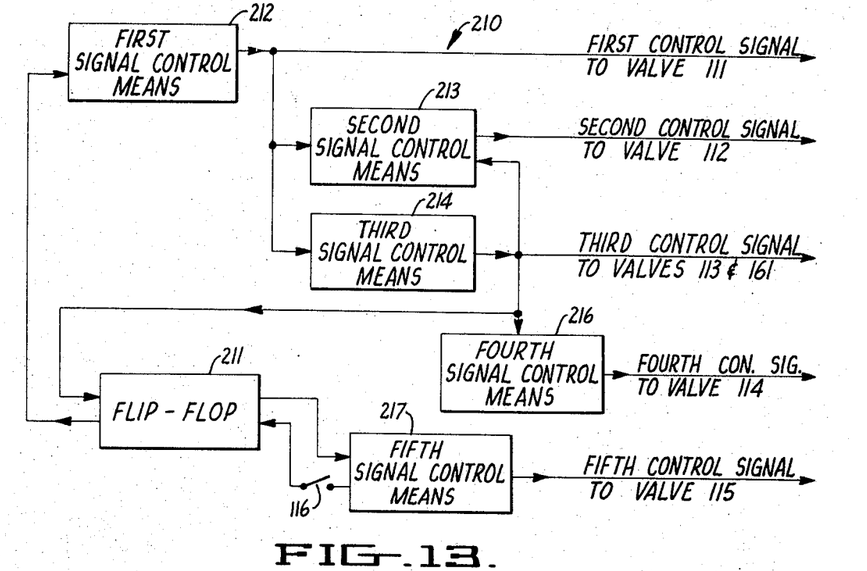
FIGURE 13, a block diagram of one form of a timing circuit constructed in accordance with the present invention.
Figure 14:
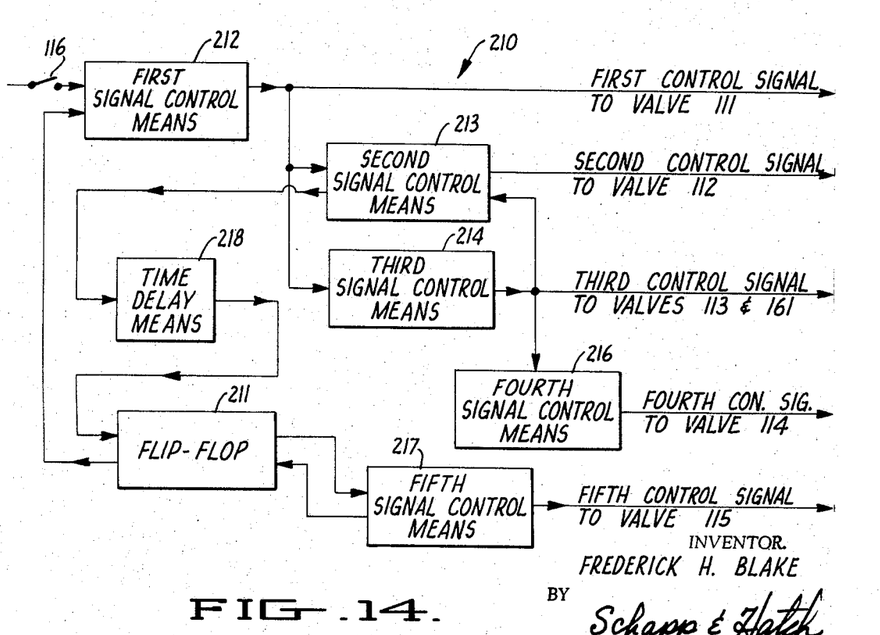
FIGURE 14, a block diagram of another form of a timing circuit constructed in accordance with the present invention and corresponding to FIGURE 15.

FIGURES 13 and 14 show alternative paths for the signal used to activate flip-flop 211 to its second stable state. The signal path from third signal control means 214 to flip-flop 211, as shown in FIGURE 13, is used in the relay embodiment of the control circuit shown in FIGURE 10, and the signal path from second signal control means 213 to flip-flop 211, as shown in FIGURE 14, is used in the solid state static logic embodiment of the control circuit shown in FIGURE 15.

As more fully described in my aforesaid copending application issuing as Patent No. 3,213,486, and as shown in the accompanying drawings, the timing and control circuit of the present invention is intended for use with a molding machine as shown in FIGURES 1 through 9 and 12. The molding machine consists essentially of a mold means 21 adapted for receiving and forming the food product into a desired shape, a charging means 22 formed for injecting a measured quantity of the food product into the mold means, a stick driver means 23 associated with the mold means 21 and having provision for inserting an elongated stick end-first into the food product contained in the mold cavity, and a control means 24 operable for actuating the mold means 21, the charging means 22, and the stick driver means 23, operating in such a manner that the food product will be formed into a desired shape and the stick inserted thereinto in sequentially occurring periods of adjustable duration.

Figure 1:
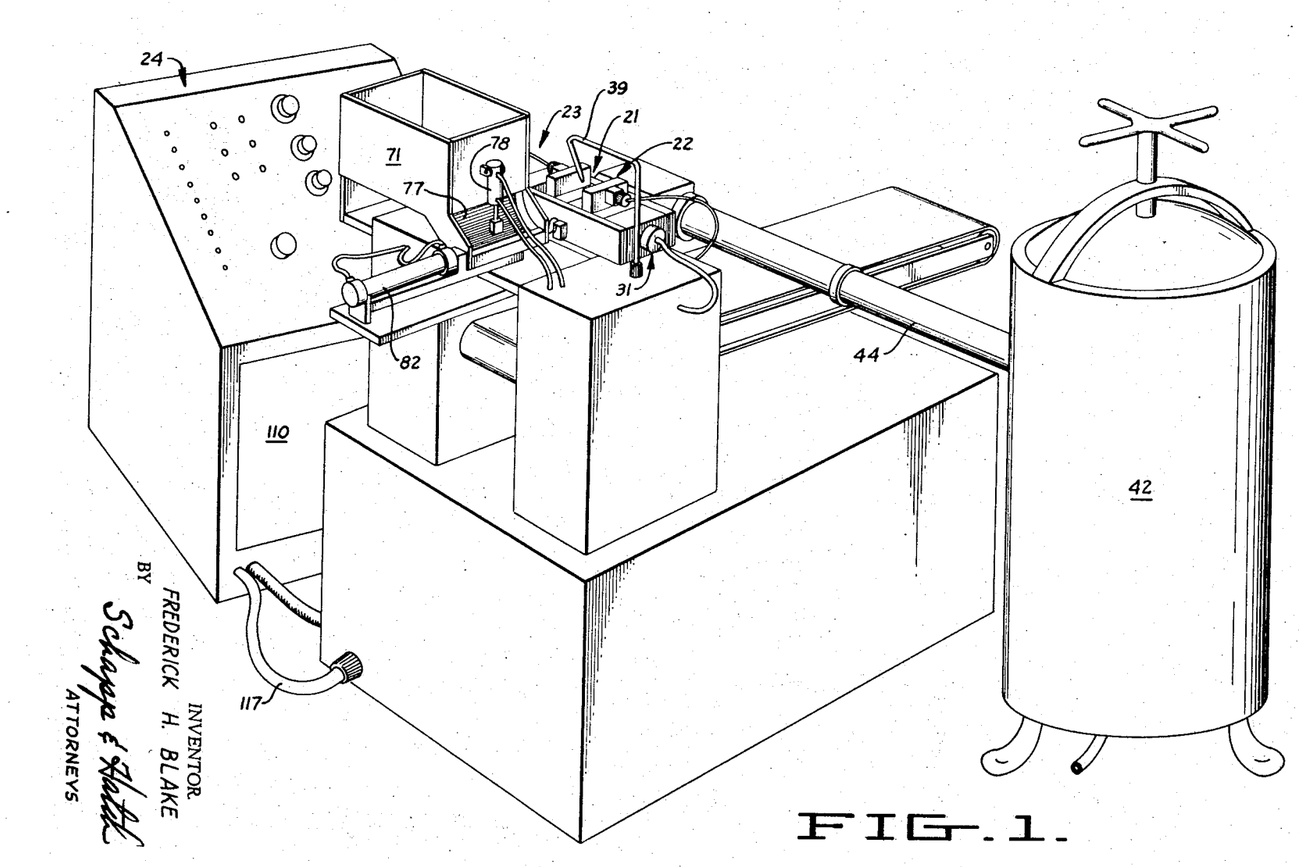
FIGURE 1 is a perspective view of a molding machine constructed in accordance with the present invention.
Figures 2, 5:
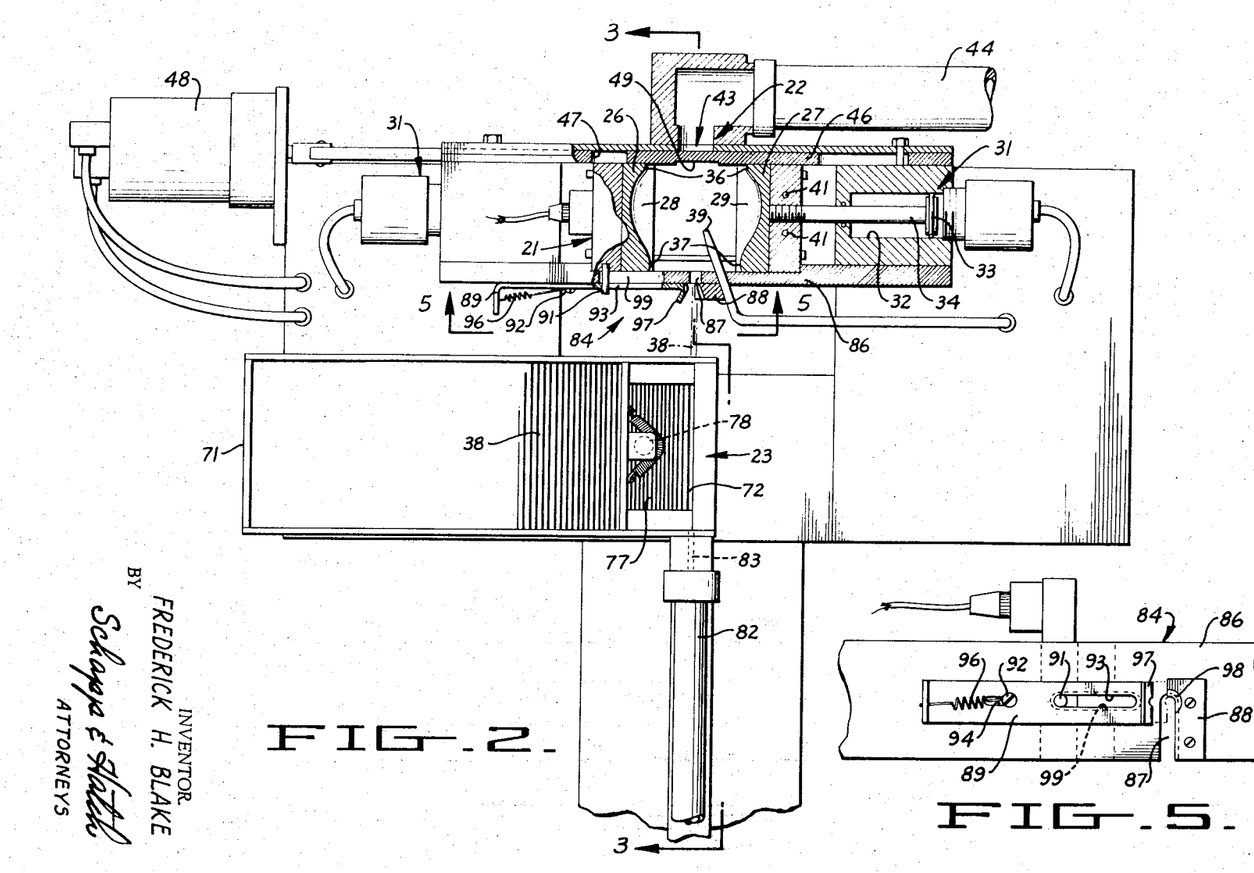
FIGURE 2, an enlarged plan view of the molding portion of the machine of FIGURE 1 with portions being broken away and shown in cross-section for clarity of illustration.
FIGURE 5, a fragmentary cross-sectional view taken substantially on the plane of line 5—5 of FIGURE 2.
Figure 3:
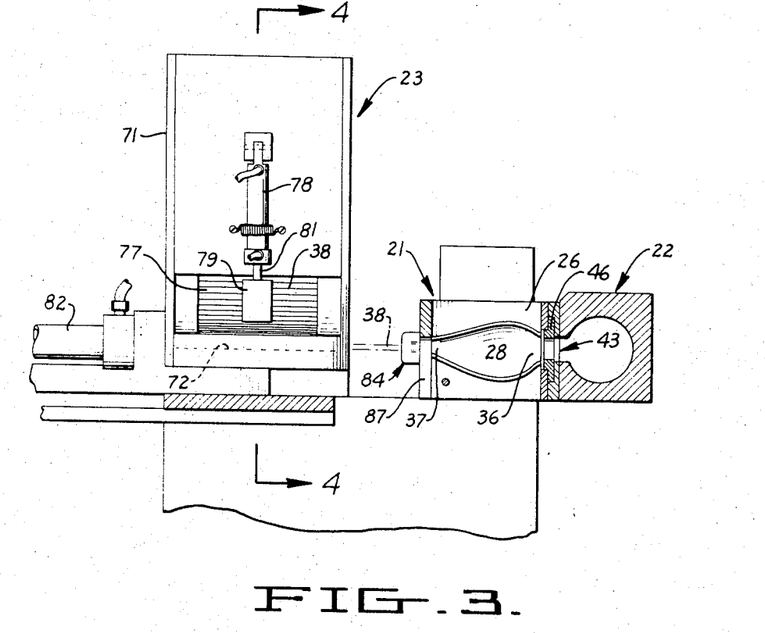
FIGURE 3, a fragmentary cross-sectional view taken substantially on the plane of line 3—3 of FIGURE 2.
Figure 4:
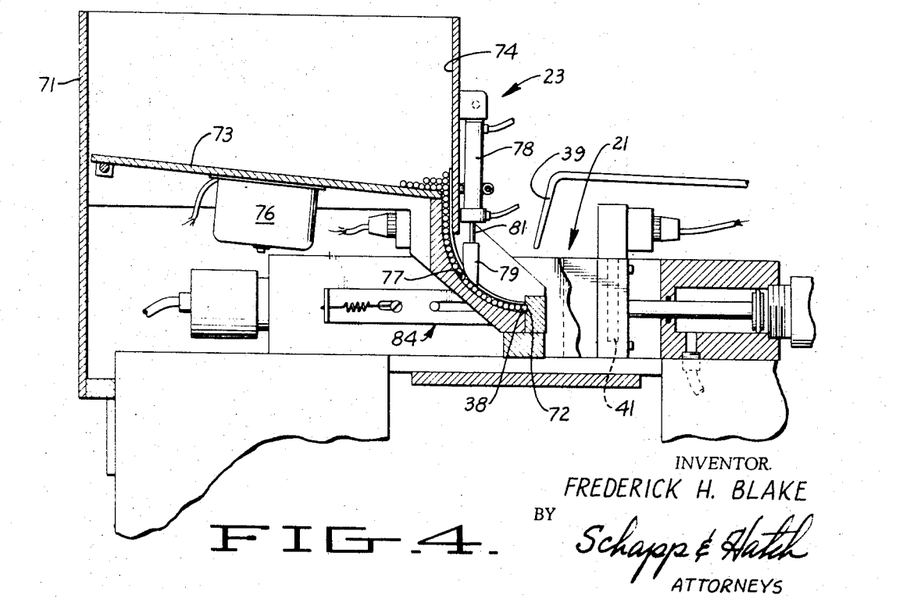
FIGURE 4, a fragentary cross-sectional view taken substantially on the plane of line 4—4 of FIGURE 3.

As may best be seen in FIGURE 2 of the drawings, the mold means 21 includes a pair of mold members 26 and 27 mounted for movement together and apart and having aligned pockets 28 and 29 defining a mold cavity when the mold members are together. Actuating means 31, for urging the mold members 26 and 27 together and apart, is provided by pneumatic cylinders 32 containing pistons 33 and connected by rods 34 to one or the other of mold members 26 and 27.

A measured quantity of the food product is injected into the mold cavity through one end thereof, while the stick is inserted through the opposite end of the mold cavity. The pockets 28–29 are formed at one end with relieved portions 36 which cooperate to define a passage for the entry of the food product to be molded. Likewise, the pockets 28–29 are formed at their other ends with relieved portions 37 which cooperate to define a passage for the end-first entry of stick handle 38. Conveniently, the stick handles 38 may consist of simple wooden skewers.

The dropping out of the molded food product from the mold cavity is preferably aided by an air blast emanating from the nozzle 39 mounted above the mold means. The nozzle 39 is positioned to direct a blast of air against the molded food product just after the mold members 26–27 are urged apart by means 31. The air blast is sometimes referred to in this specification as the "mold blow."

The charging means 22 is adapted for injecting the product to be molded into the mold cavity through passage 36 in precisely measured quantities. In the form of the invention illustrated in FIGURES 1 through 3, the charging means 22 consists of a suitable means 42 for supplying the food product to the mold means at a constant pressure, together with a product valve 43 capable of permitting flow through the passage 36 in a first terminal position and cutting off the flow through said passage in a second terminal position. The control means 24 is adapted for actuating the valve 43 to its first terminal position at a predetermined point in the cycle of operation of the machine and to actuate the valve 43 to its second terminal position a timed interval thereafter. As will be apparent, with the product being supplied at a constant pressure and with the valve 43 moving between its open and closed positions at precisely timed intervals, the quantity of meat entering the mold cavity through the passage 36 during each cycle of operation will be precisely the same as the amount of meat entering during any other cycle of operation.

The supply means 42 may consist of any suitable pumping means capable of supplying the product at a constant pressure, such as a conventional sausage stuffer machine. In the form of the invention shown in FIGURES 1–3, the product valve 43 may be termed a shear plate valve and consists of an elongated plate 46 mounted for endwise reciprocation across the passage 36 at its juncture with the conduit 44, which communicates with supply means 42. Valve plate 46 is provided with an opening 47 therethrough which registers with the passage 36 when the valve plate 46 is in the previously mentioned first terminal position and which moves a sufficient distance to shut off conduit 44 from passage 36 when the valve plate 46 is in its second terminal position. Conveniently, the valve plate 46 is actuated by a double acting pneumatic cylinder 48.

Control over the quantity of food product being injected into the mold is obtained in the form of the charging means 22 described above, by varying the length of time during which the shear plate valve is in its first terminal position, that is, when the opening 47 is registered with the passage 36. Thus, if the molded product is slightly lighter than desired, the interval may be lengthened very slightly to increase the quantity of food product injected into the mold. Similarly, if the product is too heavy, the interval may be shortened and the quantity reduced by suitable manipulation of the control means 24. The manner in which this adjustment in the duration is accomplished is described in more detail in the section of the specification relating to the control means 24.

Figure 6:
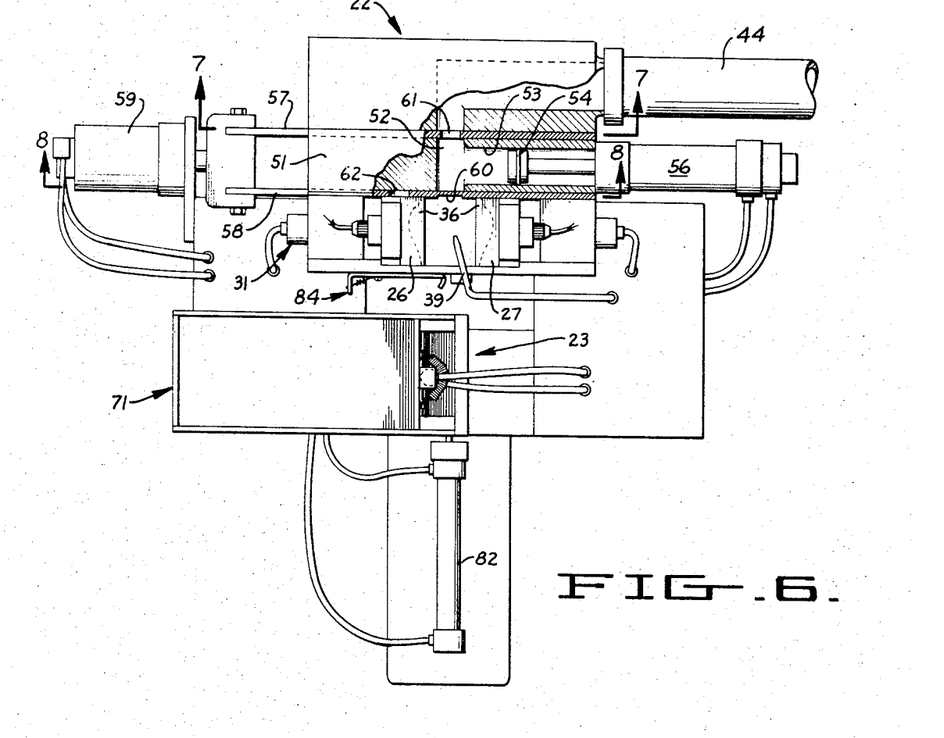
FIGURE 6, a view taken similarly to that of FIGURE 2 but illustrating a modified form of the machine.
Figure 7:
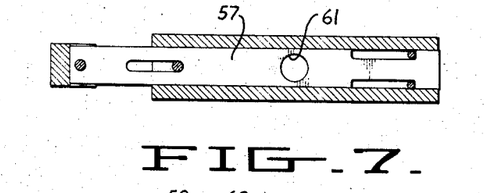
FIGURE 7, a fragmentary cross-sectional view taken substantially on the plane of line 7—7 of FIGURE 6.
Figure 8:
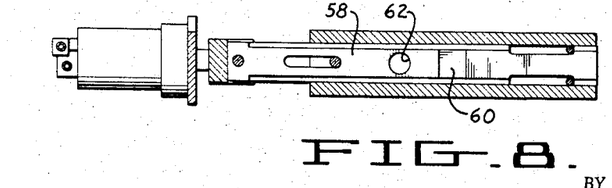
FIGURE 8, a fragmentary cross-sectional view taken substantially on the plane of line 8—8 of FIGURE 6.

In the form of the invention illustrated in FIGURES 6, 7 and 8, the charging means 22 does not depend on the length of time in which the valve supplying product to the mold chamber is open to supply a measured quantity of the food product to the mold, but rather incorporates a charging cylinder adapted to take in a measured quantity of the product and inject it into the mold cavity at the proper time. To this end, the charging means of FIGURE 6 includes a housing 51 having an internal passage 52 adapted for connection between the food product supply conduit 44 and the entrance passage 36 of the mold cavity.

A cylindrical bore 53 is formed in the housing 51 with one end of the bore opening into passage 52, and a piston 54 is mounted for reciprocation in the bore 53 by a double acting pneumatic cylinder 56. A pair of elongated shear plate valve members 57 and 58 are mounted for end-wise reciprocation in parallel spaced relation in the housing 51 on opposite sides of the bore 53 and transversely across the ends of passage 52. The valve members 57–58 are jointly reciprocated between first and second terminal positions by a double acting pneumatic cylinder 59 and are provided, respectively, with openings 61 and 62 positioned to provide communication from conduit 44 to bore 53 while the valve members 57–58 are in a first terminal position and to provide communication between bore 53 and mold cavity passage 36 when the valve members 57–58 are in their other terminal position.

The control means 24 is effective for actuating the pneumatic cylinders 56 and 59 in sequence. Cylinder 59 is initially actuated to move the valve members 57–58 to their first terminal position to admit a measured quantity of the food product to the bore 53, while at the same time blocking off the bore from the mold cavity passage 36. The food product, being supplied through conduit 44 under pressure, will enter bore 53 until it is completely full. The pneumatic cylinder 59 is then actuated to urge the valve members 57–58 to their second terminal position communicating the bore 53 with the mold cavity passage 36 and blocking off the conduit 44 from bore 53. Thereafter, the pneumatic cylinder 56 is actuated to advance the piston 54 a measured distance in the bore 53 so as to inject the measured quantity of the product into the mold cavity.

Figure 12:
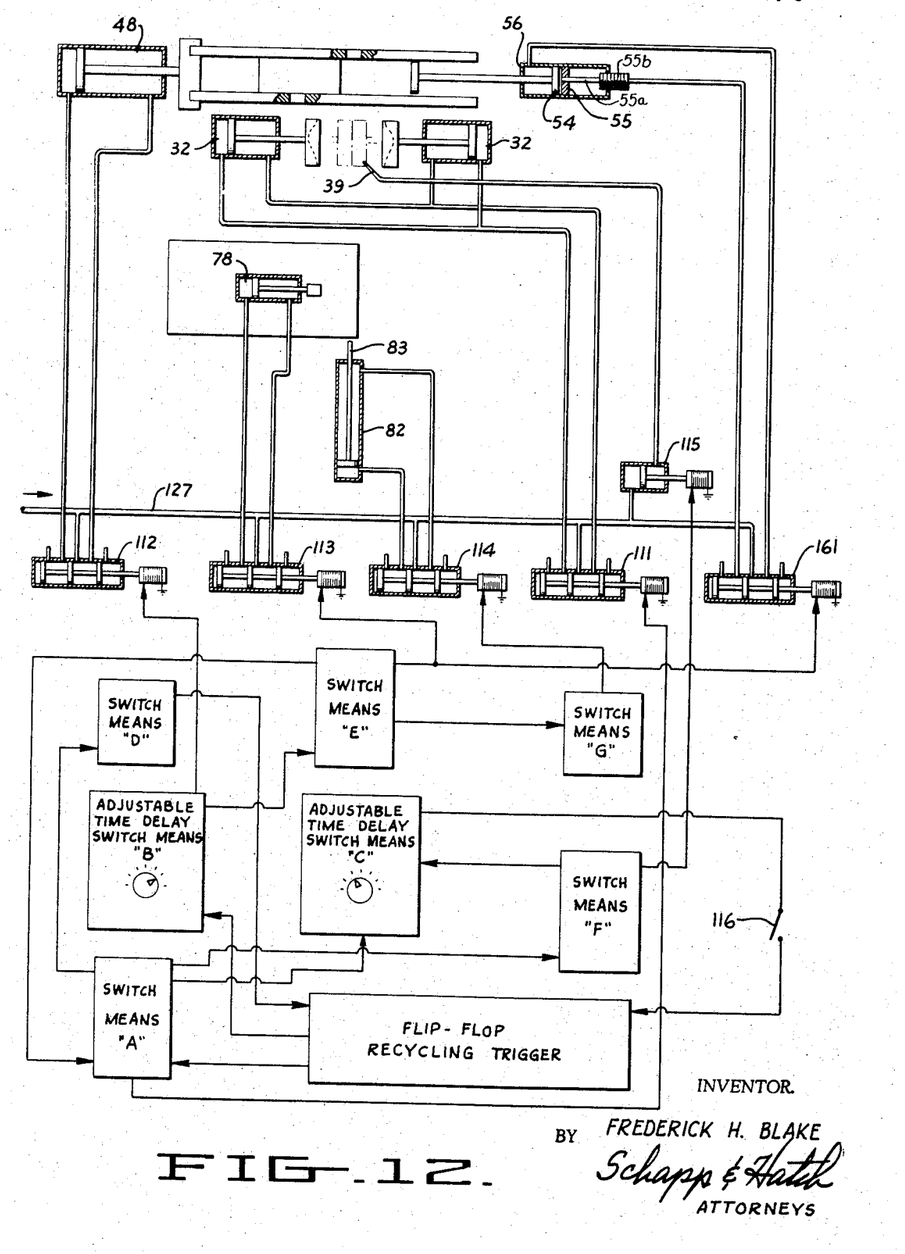
FIGURE 12, a view similar to that of FIGURE 9 but showing a modified form of the invention.

Control of the quantity of product injected into the mold cavity is obtained in this form of the invention by varying the stroke of piston 54 and thus the amount of product it displaces. For this purpose, a conventional variable stroke pneumatic cylinder 56 such as that manufactured by the Ortman-Miller Machine Co., Inc., of Hammond, Ind., and shown in their Bulletin No. 101A, may be used to actuate piston 54. With this system, increasing or decreasing the length of stroke of piston 54 by retracting or advancing adjustable member 55 (see FIGURE 12) will correspondingly increase or decrease the weight of the individual mock chicken leg. As shown in FIGURE 12, retracting and advancing the adjustable stop member 55 is accomplished by mounting member 55 on a rod 55a secured to a member 55b threaded in the end of the pneumatic cylinder 56.

As shown in FIGURES 1 through 5 of the drawings, the stick driver means 23 is adapted for inserting an elongated stick 38 end-first through the passage 37 into the food product contained in the mold cavity. The stick driver means here includes a box-like reservoir 71 formed to contain a supply of sticks and to deliver them in one-at-a-time order to a trough 72 which is aligned with passage 37 defined by the mold members 26–27 in closed position. The floor 73 of the reservoir is inclined downwardly toward the end 74 of the reservoir confronting the trough 72, and the sticks are preferably urged into such end by the action of a vibrator 76 mounted on the floor 73. When the sticks reach end 74, they drop downwardly in side-by-side relation along a curved ramp 77 and into trough 72.

In order to be sure that the stick 38 lies in the proper position in trough 72, a hold-down device is provided in the form of a small, vertically disposed double acting pneumatic cylinder 78 having a stick engaging shoe 79 mounted at the end of its piston rod 81. The cylinder 78 is supplied with air to hold shoe 79 down against the sticks in ramp 77 during the time the lower-most stick is being urged end-wise through trough 72 and into the mold cavity.

The end-wise movement of the stick 38 is accomplished by a double acting pneumatic ram 82 aligned with the trough 72 and having a plunger 83 capable of engaging the rear end of the stick and shoving it end-first through the trough and through passage 37 into the mold cavity. As will be explained more fully, the control means 24 actuates the ram 82 when the mold members 26–27 are together and a desired quantity of food product has entered the mold cavity.

A releasable clutch means 84 is provided for holding the stick 38 in its inserted position in the mold cavity until the mold members 26–27 are moved apart. The clutch means 84 may best be seen in FIGURES 2 and 5 of the drawings. The structural member 86 which supports the mold means 21 is formed with a slot 87 through which the stick can pass from trough 72 through passage 37 into the mold cavity. Secured at one side of slot 87 is an anvil plate 88 which is cooperative with a holding bar 89 mounted, by means of pins 91 and 92 at slots 93 and 94, for endwise reciprocation toward and away from anvil member 88. A spring 96 is connected between pin 92 and bar 89 and is biased to urge the bar in the direction of the anvil 88.

When pneumatic ram 82 is actuated to drive the stick 38 toward the mold cavity, the forward end of the stick will be inserted between the anvil 88 and the confronting end 97 of bar 89, the spring 96 being biased to urge the bar 89 toward the anvil, thus clamping the stick between the bar end 97 and anvil 88. To facilitate entry of the stick between the bar 89 and anvil 88, the end 97 of the bar is bent backwardly at an angle, and the confronting edge 98 of the anvil is chamfered to provide a funnelling effect.

The pin 91 is secured to mold member 26 and moves horizontally therewith in a slot 99 formed in member 86 and in the slot 93 provided in bar 89. The slot 93 is somewhat shorter than slot 99 so that pin 91 will engage the end of slot 93 and move the bar 89 away from the anvil 88 as the mold member 26 is retracted. Thus, it will be seen that the clutch means 84 will hold the stick during the initial separation of the molded product from mold pockets 28–29 and will thereafter release the stick so it can drop through slot 87 as the molded product is dropped from between mold members 26–27.

As here shown, the mold actuating cylinders 32, the plate valve cylinder 48, the stick hold-down cylinder 78, and the stick driver ram 82 are each operated by electrically operated solenoid valves 111, 112, 113 and 114, respectively. When the charging means 22 is of the form shown in FIGURES 6 and 12 of the drawings, that is, incorporating a charging cylinder, the charging cylinder 56 is operated by an electrically operated solenoid valve 161. The valves 111–114 and 161 may be of any suitable solenoid-driven two-position type. These valves are schematically depicted in FIGURES 9 and 12 of the drawings, which illustrate the manner in which the positioning of the valves controls the supply of air to their respective cylinders.

As here shown, each of the cylinders is of the double acting type so that air under pressure supplied to the rear end will advance the piston toward the head end and air under pressure supplied to the head end of the cylinder will retract the piston to the rear end. The valves 111–114 and 161 are of the spring return type so that energizing of their solenoids will move the valve members to one valving position and de-energizing of the solenoids will cause the valve members to move to the other valving position under the influence of their self-contained springs. As additional solenoid operated valve 115 is provided for releasing the air blast or mold blow which insures dropout of the molded product from the mold members 26–27 as the mold members move apart. Solenoid valve 115 is likewise of the spring return type so that energizing of its solenoid will cause it to open and admit the blast of air for the mold blow, and de-energizing of its solenoid will cause it to close and terminate the mold blow.

The control means 24 includes a timing and control circuit 210 for selectively energizing the solenoid valves 111–115 and 161. Solenoid valve 111 is actuated by a first control signal supplied by timing and control circuit 210, and solenoid valve 112 is actuated by the second control signal produced by that circuit. A third control signal is produced by timing and control circuit 210 for activation of solenoid valve 113 controlling the stick hold-down and activation of solenoid valve 161 controlling the charging piston. A fourth control signal is also produced by timing and control circuit 210 and furnished to solenoid valve 114 for operating stick driver ram 82. Solenoid valve 115 is energized by a fifth control signal produced by timing and control circuit 210, and when so energized operates to produce the blast of air known as the mold blow. In the form of the present invention shown in FIGURE 15, the fifth control signal also serves to operate the driving coil 259 of a counter which registers the number of molded food units produced by the machine.

Figure 9:
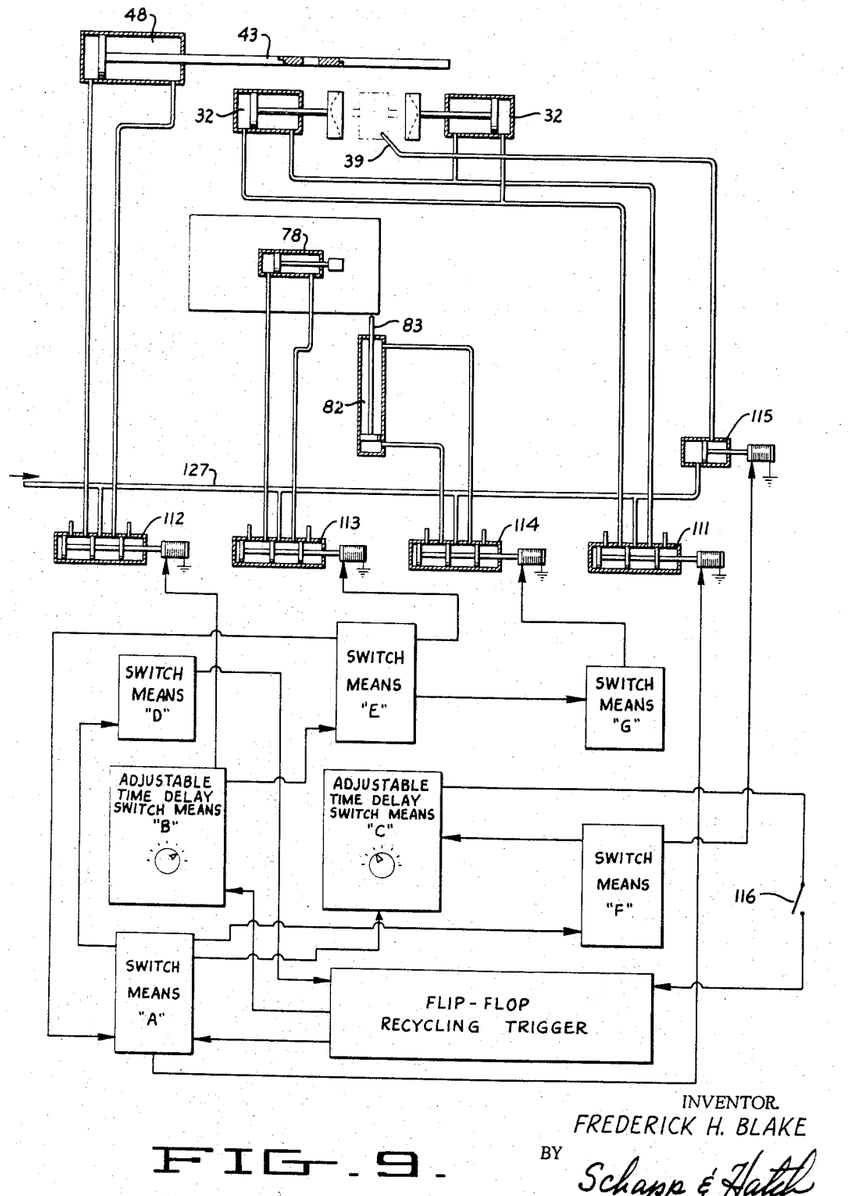
FIGURE 9, a schematic view of the actuating portions of the machine illustrated in operative association with a diagrammatic representation of the functions of the control circuits.
Figure 10:
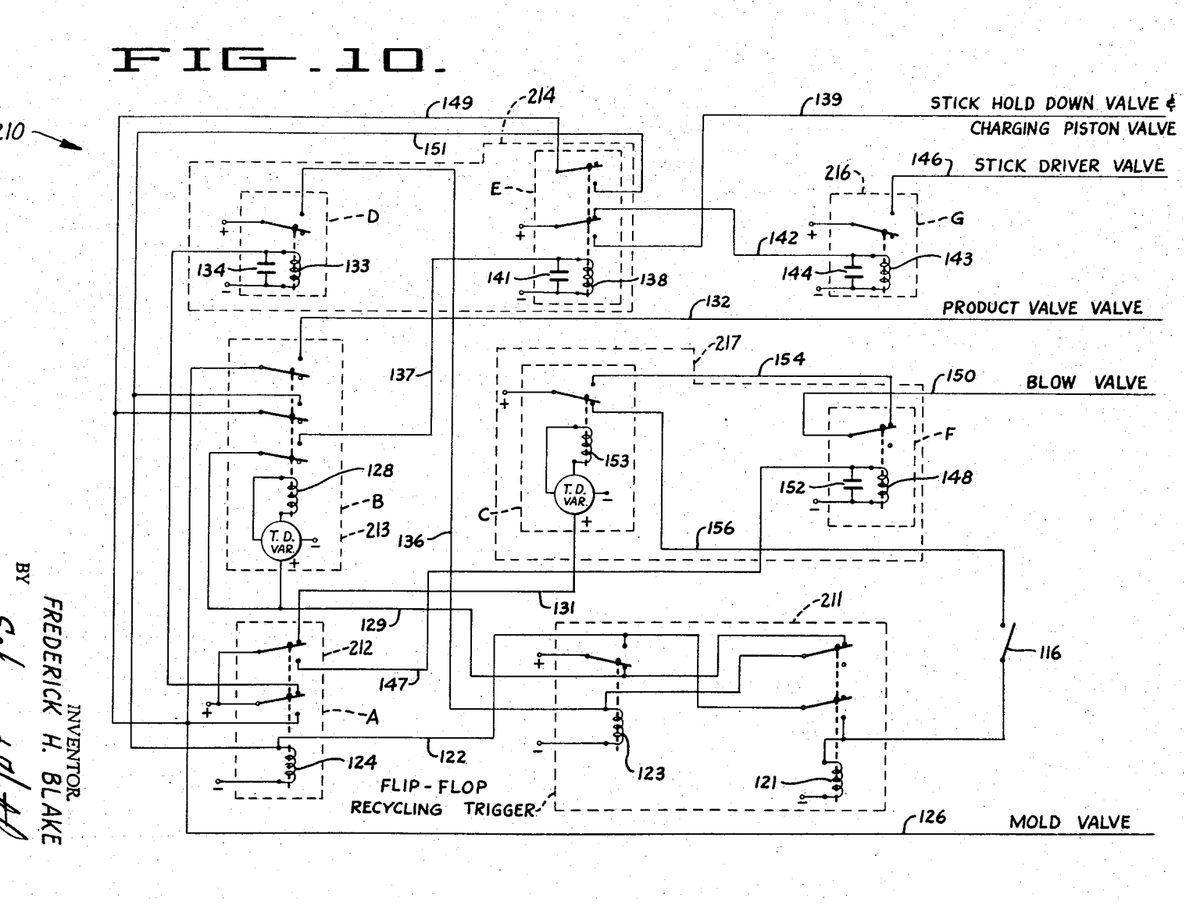
FIGURE 10, a circuit diagram of a control means forming part of the present invention.

Referring to FIGURES 9, 10 and 12, the relay embodiment of the timing and control circuit 210 of the present invention is adapted for providing a plurality of control signals to the solenoid valves 111–115 and 161 in a predetermined time sequence. As here shown, the timing circuit includes a flip-flop having two stable states of operation. Also included in the timing circuit, as shown in FIGURES 9, 10 and 12, is a first switch means A which is coupled to the flip-flop to close in response to the activation of the first stable state of the flip-flop, the closing of first switch means A generating a first control signal to solenoid valve 111.

A first time delay switch means B is coupled to the flip-flop to open in response to the activation of the first stable state. A second time delay switch means C is coupled to the first switch means A to open in response to the closing of the first switch means A, the opening of the first time delay switch means B generating a second control signal to the solenoid valve 112. Coupled to the first switch means A is a second switch means D, the latter being adapted to open after a pre-set time delay in response to the closing of the first switch means A. In addition, the second switch means D is coupled to the flip-flop to activate the flip-flop to its second stable state in response to the opening of the second switch means D.

A third switch means E is coupled to the first time delay switch means B so as to close in response to the opening of the first time delay switch means B, generating a third control signal to the solenoid valve 113. The first time delay switch means B is adapted to close in response to the activation of the second stable state of the flip-flop, and the closing of the first time delay switch means B opens the third switch means E after a pre-set time delay, terminating the third control signal to the solenoid valve 113. A fourth switch means F is also coupled to the first switch means A to close in response to the closing of the first switch means A.

The first switch means A is connected to open in response to the opening of third switch means E, the opening of the first switch means A closing the second time delay switch means C and opening the fourth switch means F, which generates a fifth control signal to a solenoid valve 115 which supplies air to the blow-down nozzle 39.

Conveniently, a time delay may be provided to delay the actuation of solenoid valve 114 whereby the stick may be inserted into the mold at exactly the time desired. This is accomplished by the provision of a fifth switch means G which opens after a pre-set time delay in response to the closing of the third switch means E, generating the fourth control signal to the solenoid valve 114.

The switching means A through G may be provided by any suitable control elements having the desired characteristics. As shown in FIGURES 9, 10 and 12, these control elements consist of magnetic relays interconnected in such manner as to provide the described sequential operation. A typical circuit incorporating magnetic relays is illustrated in FIGURE 10 of the drawings. As seen in FIGURE 10, the relays constituting the switch means D, E, F and G are provided with capacitors connected in parallel with their coils. The value of these capacitors determines the time period during which the coils will remain energized to hold the relays in closed position. Thus, the pre-set times described in connection with switch means D, E, F and G may be regulated simply by providing the correct capacitor.

The time delay switch means B and C are of a type well known in the art wherein the time period between receipt of the signal and the energizing of the coil may be controlled simply by rotating a control knob. I prefer to use the variable (solid state) time delay relays having a range of $1/100$ second to 1 second, such as the Agastat solid state time delay relay, Type 2705–A–3A, commercially available from Elastic Stop Nut Corporation of America, Elizabeth, N.J.

Figure 15:
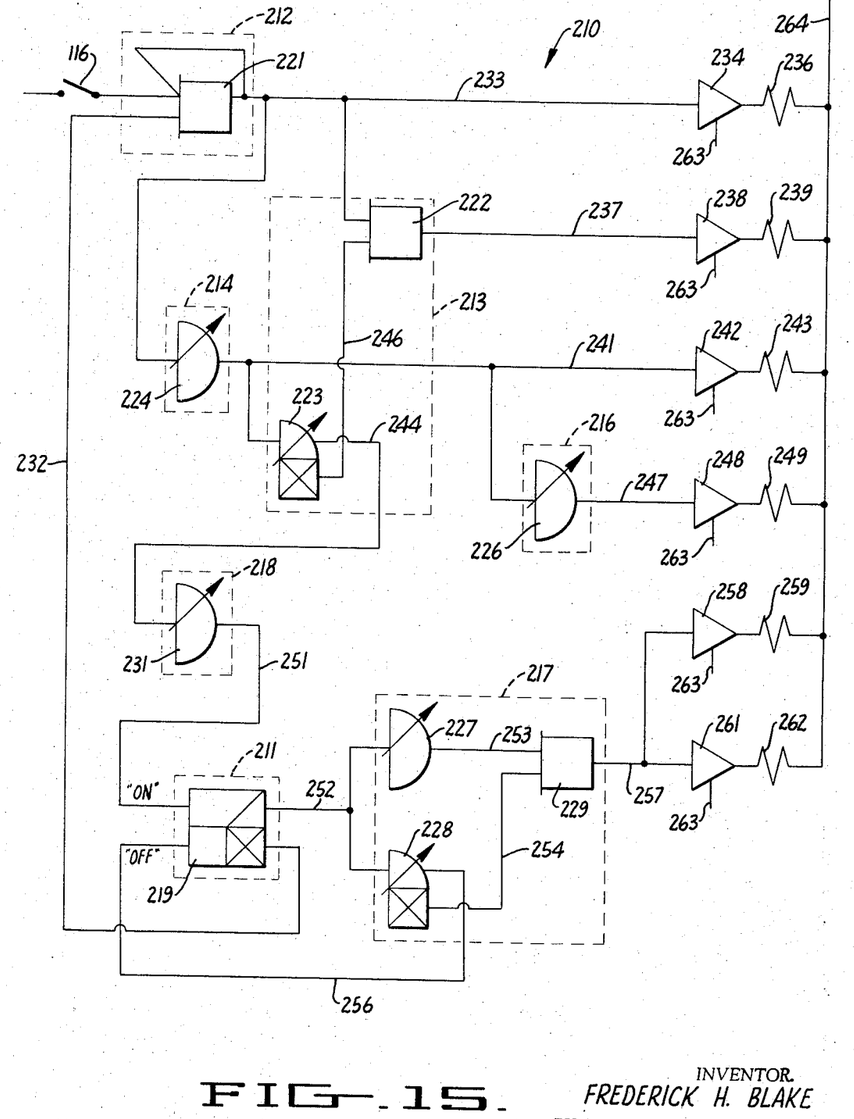
FIGURE 15 is a block diagram in semi-schematic form, using well-known English logic symbols, of another embodiment of the timing circuit of the present invention.

FIGURE 10 has been slightly amended by the addition of dotted outline surrounding functional units of the circuit corresponding to the blocks in FIGURE 13 and the dotted outlines in FIGURE 15. Thus, it may be seen that relays 121 and 123 are cross-connected to form a bi-stable flip-flop designated as flip-flop 211. Relay 124 forms switch means A, which is designated in FIGURES 10 and 13 as first signal control means 212, and relay 128 forms time delay switch means B, which is designated in FIGURES 10 and 13 as second signal control means 213. Relays 133 and 138, forming switch means D and E, respectively, in FIGURES 9, 10 and 12, are shown as a single functional unit in FIGURES 10 and 13 and designated as third signal control means 214. Relay 143 forms switch means G of FIGURES 9 and 12, and is designated in FIGURES 10 and 13 as fourth signal control means 216. Relays 153 and 148 forming time delay switch means C and switch means F, respectively, in FIGURES 9, 10 and 12, are designated in FIGURES 10 and 13 as a single functional unit, fifth signal control means 217.

In operation, the relays are initially positioned as illustrated in FIGURE 10 of the drawings. When the cycle switch 116 is closed the coil of relay 121 of the flip-flop circuit is energized to close the relay. This supplies current through lead 122 to the first switch means A. At the same time relay 121 cuts off the power supply to the coil of relay 123, causing the latter to open and the flip-flop circuit to remain in its first stable state of operation until the coil of relay 123 is energized.

The power supplied through lead 122 energizes the coil of relay 124, moving the relay to closed position. This generates the first control signal which energizes the solenoid valve 111 through lead 126. This displaces the valve member of valve 111 to supply air under pressure from conduit 127 to the rear side of actuating cylinders 32, thus urging the mold members 26–27 together to provide the mold cavity.

As previously stated, the first time delay switch means B is coupled to the flip-flop circuit to open in response to the activation of the first stable state, this being accomplished when the de-energizing of the coil of relay 123 causes the relay to move to open position, cutting off the flow of current through lead 129. The closing of relay 124 cuts off the current being supplied to the second time delay switch means C through lead 131. The described opening of relay 128 generates the second control signal in lead 132 to supply actuating current to the solenoid valve 112. This displaces the valve member to connect air supply conduit 127 to the rear end of cylinder 48, causing shear plate valve 43 to move into alignment with the entrance passage 36 of the mold cavity.

Closing of relay 124 cuts off the power being supplied to relay 133 in switch means D. Because of the presence of capacitor 134, the relay 133 will open after a pre-set time delay. The opening of relay 133 supplies current through lead 136 to relay 123 to activate the flip-flop circuit and cause it to assume its second stable state of operation.

Opening of relay 128 connects lead 129 to lead 137 which is in turn connected to the coil of relay 138 contained in switch means E. When relay 123 is energized through lead 136, it supplies power to lead 129. This power proceeds through lead 137 to energize relay 138 until such time as the time delay contained in switch means B completes its cycle, causing relay 128 to be energized. During the time delay period of B, relay 138 is closed and this generates the third control signal, supplying power through lead 139 to solenoid valve 113, which then supplies air from conduit 127 to the rear end of hold-down cylinder 78.

Capacitor 144 will delay the opening of relay 143 until a pre-set time delay has elapsed after the closing of the relay 138. The opening of relay 143 generates the fourth control signal by supplying power through lead 146 to solenoid valve 114, causing the latter to supply air to the rear end of stick driver ram 82. The closing of relay 128 in response to the activation of the second stable state of the flip-flop circuit, and after the variable time delay period has elapsed, cuts off the supply of power through lead 137 to relay 138. Because of the capacitor 141 the relay 138 will remain closed for a pre-set time and will thereafter open. The opening of relay 138 terminates the fourth control signal by supplying power through lead 142 to the coil of relay 143 contained in switch means G.

Closing of relay 124 also supplies power through lead 147 to the coil of relay 148 contained in switch means F, moving relay 148 to closed position. The opening of relay 138 cuts off the power being supplied through leads 149 and 151 of a holding circuit for relay 124, thus causing relay 124 to move to open position. The opening of relay 124 supplies power to the time delay switch means C, and cuts off the power being supplied to relay 148 through lead 147. Because of capacitor 152 a pre-set time delay will elapse before relay 148 opens and generates the fifth control signal by supplying power through lead 150 to the solenoid valve 115, causing the latter to supply air to the blow-down nozzle 39.

The coil of relay 153 in time delay switch means C will be energized to close the relay after the selected period of time has elapsed. The closing of relay 153 cuts off the current being supplied to switch means F through lead 154 and at the same time supplies current to lead 156 connected to cycle switch 116. So long as the cycle switch remains closed, this signal will again energize relay 121 and activate the flip-flop circuit to again initiate the described cycle of operation.

The solenoid vaves 111–115, being of the spring return type, will move to their other terminal positions and supply air to the front side of their respective pneumatic cylinders when power is no longer being supplied to them through their respective leads 126, 132, 139, 146 and 150. The described circuitry will cause the energizing of the different solenoid valves in the desired sequentially occurring periods of adjustable duration.

Figure 11:
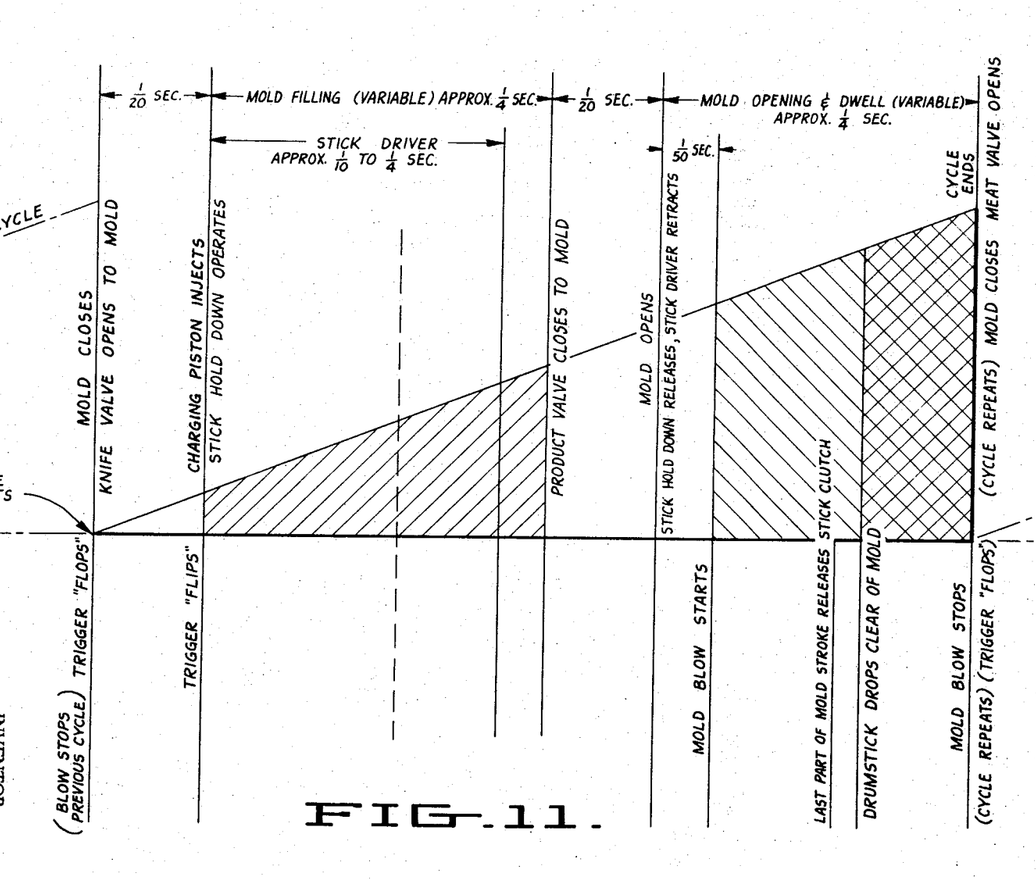
FIGURE 11, a graphic depiction of the interrelationship between the actuation times for the various operative elements of the machine as controlled by the timing circuits.

The sequence and typical duration of these periods is illustrated graphically in FIGURE 11 of the drawings. As seen therein, the first control signal triggers the flip-flop circuit, causing the actuating means 31 to close the mold and at the same time causing the knife valve 43 to move to its first terminal position to supply the product to the mold cavity. Approximately $\frac{1}{20}$ of a second later the flip-flop circuit is triggered, resulting in the third control signal being supplied to the stick hold-down solenoid valve. This period to time is approximately that required for the mold members to close and the shear plate valve 43 to open. The length of time during which product is filling the mold is controlled by the time delay switch means B and as here shown will require approximately $\frac{1}{4}$ of a second. As mentioned above, this period is made variable in order to control the amount of product entering the mold. At the end of the variable period the second control signal ceases and the shear plate valve 43 immediately moves to closed position. At the same time the fourth control signal causes ram 82 to drive the stick handle into the product contained in the mold cavity.

In order to prevent the stick from being displaced to one side of the mold cavity by the incoming food product, I prefer to wait until the cavity has at least partially filled with the food product before inserting the stick handle. As shown in FIGURE 11, the stick driver begins to insert the stick simultaneously with the closing of the shear plate valve 43, that is, when the mold is full. It is possible, however, to speed up the action somewhat by selecting a condenser 144 which will supply the fourth control signal to the stick-driver solenoid valve 114 before the mold is completely full. As shown in FIGURE 11, the stick driver should be activated at least $\frac{1}{10}$ second to $\frac{1}{4}$ second after the product valve opens. In any event, the stick should not be inserted into the mold before at least a substantial amount of product has entered.

Approximately $\frac{1}{20}$ of a second after the second control signal ceases and the fourth control signal is generated, the first, third and fourth control signals cease, causing the mold to open, the stick hold-down to release, and the stick driver to retract.

Approximately $\frac{1}{50}$ of a second after this, the fifth control signal is generated to start the mold blow-down through nozzle 39. This $\frac{1}{50}$ of a second delay between the opening of the mold and the beginning of the blow-down permits the mold to open slightly and avoids splattering the food product. Approximately $\frac{1}{8}$ of a second later the last part of the mold stroke releases the stick clutch 84, allowing the molded product to drop clear, this action taking on the order of $\frac{1}{100}$ of a second.

The cycle could end at this point, but in order to provide for unexpected contingencies, I prefer to extend the time period approximately the amount shown in FIGURE 11. This provides a cycle duration of approximately $\frac{6}{10}$ of a second, resulting in a production rate of approximately 100 units of finished product per minute.

When the charging means 22 is of the form shown in FIGURES 6 and 12 of the drawings, that is, incorporating a charging cylinder, the lead 139 is connected to a solenoid valve 161, formed to supply air to cylinder 56, as well as to solenoid valve 114. Thus, the charging piston 54 will operate to inject the measured quantity of product into the mold when the flip-flop circuit is triggered the second time, approximately 1/20 of a second after the cycle commences. The time delay switch means B should be set to allow sufficient time for the charge to be displaced into the mold.

The embodiment of the timing circuit of the present invention shown in FIGURE 15 has been designed for use with transistorized static logic circuit components. Although magnetic relay units as used in the embodiment of FIGURES 9, 10 and 12 are quite satisfactory and suitable for performing the necessary control, they have the disadvantage of utilizing moving parts which are subject to wear. Transistorized static logic control units contain no moving parts or electrical contact points such as magnetic relays do, and hence are not subject to wear failure and the fouling of contact points by dirt and debris. Also, such static logic units are highly sensitive, so that they may be used with low current sensing devices for providing input signals. Such transistorized static control units are available commercially, for example, from the General Electric Company and a full explanation of these units is given in the General Electric Bulletin GPZ–B53B. I prefer the General Electric units as shown in that bulletin, as they have the convenience of being standardized plug-in units, which may be changed as easily as radio tubes. In order to prevent confusion, the same symbols are utilized in the drawings herein as those utilized in the General Electric Bulletin for the various static logic components involved.

The logic units used in the embodiment shown in FIGURE 15 comprise an OFF RETURN MEMORY unit 219 having a NOT output, a two-input SEALED AND unit 221, two two-input AND units 222 and 229, and six TIME DELAY units 223, 224, 226, 227, 228 and 231.

The OFF RETURN MEMORY unit is adapted to provide a "direct" output signal at the output schematically indicated at the upper right of the block when the unit is "on" and adapted to provide a "NOT" signal at the output schematically indicated at the lower right of the block when the unit is "off." Signal inputs are schematically shown on the left-hand side of the unit, with the "on" input being provided at the upper left. When a signal is provided to this "on" input, the "direct" output emits a signal and this signal continues even though the "on" input discontinued. The "direct" output is discontinued when a signal is provided to the "off" input at the lower left of the block. The "NOT" output produces an output signal whenever no "direct" output signal is being produced by the unit, and produces no signal whenever a "direct" output signal is being produced.

The AND logic units provide an output signal when inputs are present on all of the input lines. The operation of the SEALED AND unit is similar to the AND except that one of the inputs is sealed to the output, so that once operation of the unit is begun, output signal is fed back to the sealed input. Thus, subsequent interruption of that input will not terminate operation of the SEALED AND, and it is necessary to interrupt one of the inputs which is not "sealed" in order to terminate the output signal from the unit.

The TIME DELAY units provide an output, schematically indicated at the right-hand side of the block, a controlled time interval after receiving an input signal on the input, schematically indicated on the left-hand side of the block. Certain of the TIME DELAY units are provided with a NOT output which functions in a manner similar to the NOT output of the OFF RETURN MEMORY. This NOT output is indicated by the symbol of an "X" mark in a square and provides an output whenever the unit is not producing an output on its other or "direct" output line.

The sealed input of SEALED AND 221 is connected to a power supply (not shown) through cycle switch 116. The other input of SEALED AND 221 is connected through line 232 to the NOT output of OFF RETURN MEMORY 219. The output of SEALED AND 221 constitutes the first control signal, and is coupled through line 233 to the appropriate DC amplifier 234 for driving the solenoid coil 236 of valve 111. This signal is also furnished to one input of AND 222 and to the input of TIME DELAY unit 224. The output of AND 222 constitutes the second control signal and is coupled by line 237 to the appropriate amplifier 238 for driving the solenoid coil 239 of meat valve 112. The output of TIME DELAY unit 224 constitutes the third control signal and is coupled on line 241 to the appropriate amplifier 242 for driving the solenoid coils, one of which is indicated at 243, of valves 113 and 161. This signal is also supplied to the input of TIME DELAY unit 223 and the input of TIME DELAY unit 226. The "direct" output of TIME DELAY unit 223 is coupled on line 244 to the input of TIME DELAY unit 231, and the NOT output of TIME DELAY unit 223 is coupled on line 246 to the other input of AND 222. The output of TIME DELAY unit 226 constitutes the fourth control signal and is coupled through line 247 to the appropriate amplifier 248 for driving the solenoid coil 249 of valve 114.

The output of TIME DELAY unit 231 is coupled through line 251 to the "on" input of OFF RETURN MEMORY 219. The "direct" output of OFF RETURN MEMORY unit 219 is coupled through line 252 to the inputs of TIME DELAY units 227 and 228. The "direct" output of TIME DELAY unit 227 is coupled to one input of AND 229 through line 253 and the NOT output of TIME DELAY unit 228 is coupled through line 254 to the other input of AND 229. The "direct" output of TIME DELAY unit 228 is coupled through line 256 to the "off" input of OFF RETURN MEMORY 219. The output of AND 229 constitutes the fifth control signal and is coupled through line 257 to the appropriate amplifiers 258 and 261 for operating the driving coil 259 of a counter and the solenoid coil 262 of valve 115. Power is supplied to amplifiers 234, 238, 242, 248, 258, and 261 and to solenoid coils 236, 239, 243, 249, 262 and counter 259 through power busses 263 and 264.

At the beginning of the cycle of operation, the sealed input of SEALED AND 221 is supplied with a signal through cycle switch 116 and the other input of SEALED AND 221 is supplied with a signal from the NOT output of OFF RETURN MEMORY 219. When these are both present, SEALED AND 221 produces the first control signal to valve 111 and the molds are closed. This first control signal is also supplied to one input of AND 222, and as the other input of AND 222 is already being supplied with a signal from the NOT output of TIME DELAY unit 223, AND 222 immediately produces an output, which is the second control signal, to operate the solenoid valve 112 which in turn controls the meat valve. The first control signal is also supplied to TIME DELAY unit 224 to trigger it, after an appropriate time delay, to produce the third control signal for operating valves 113 and 161. The delay interposed by TIME DELAY unit 224 allows time for the meat valve 43 to fully open, and is preferably of the order of 1/20 of a second. This third control signal is also supplied to TIME DELAY units 223 and 226 to trigger their operation.

TIME DELAY unit 223 allows a controlled period of time, preferably of the order of 1/3 second, to elapse, during which the mold is being filled with food, and then produces a "direct" output which is transmitted to TIME DELAY unit 231 and terminates production of its NOT output which had previously been supplied to AND 222. Termination of this NOT output removes an input from AND 222, causing it to terminate its output, the second control signal, thereby operating valve 112 to cause closing of the meat valve. Thus, adjustment of the delay time of TIME DELAY unit 223 will regulate the mold filling time.

TIME DELAY unit 226 delays production of the fourth control signal for a period of the order of 1/10 second after receiving the third control signal. This delay allows time for some food to enter the mold before the fourth control signal activates solenoid valve 114 to drive the stick handle into the formed meat product.

To ensure full closure of the meat valve before the molds open, TIME DELAY unit 231 allows an appropriate period of time of the order of 1/20 second to elapse before producing a signal on line 251 to the "on" input of OFF RETURN MEMORY 219. The "direct" output of OFF RETURN MEMORY 219 then triggers TIME DELAY units 227 and 228. After a delay sufficient to allow the molds to open, about 1/20 second, TIME DELAY unit 227 produces an output on line 253 to AND 229. A signal is already present from the NOT output of TIME DELAY unit 228 on the other input of AND 229, so the output of AND 229, the fifth control signal, is immediately produced to operate solenoid valve 115 and begin the mold blow, and to operate the driving coil 259 of the counter to tally the production of one molded food unit. TIME DELAY unit 228 begins operation at the same time as TIME DELAY unit 227 but operates for a longer period, of the order of 1/3 second, to give sufficient time for operation of the mold blow and counter and the desired degree of dwell between cycles of the control circuit. After the elapse of that time, TIME DELAY unit 228 produces a "direct" output on line 256 to the "off" input of OFF RETURN MEMORY unit 219 and OFF RETURN MEMORY 219 then produces its NOT output on line 232 to SEALED AND 221 to initiate the cycle once again. At the same time, the NOT output of TIME DELAY unit 228 is terminated, thus removing an input from AND 229 and terminating production of the fifth control signal thereby.

Due to the "sealed" nature of the input of SEALED AND 221 which is connected to cycle switch 116, cycle switch 116 may be opened while a cycle is in progress without interrupting the operation of the machine until the cycle is completed. If cycle switch 116 is opened, the machine will not proceed to a new cycle upon completion of a former one, even though an input is present on line 232 from the NOT output of OFF RETURN MEMORY 219, as no input signal is available on the sealed input and the SEALED AND unit is not producing an output to be fed back to that input. TIME DELAY units 223 and 228 are made readily adjustable at the control panel of the machine to facilitate control of the length of time the mold is filled and of the overall speed of the machine by controlling the time dwell between cycles.

The embodiment of the timing circuit shown in FIGURE 15 has been described in terms of what is widely referred to as "English" logic. However, it must be appreciated that the functional elements of this timing and control circuit could readily be performed and easily be designed in terms of other logic systems, such as NOR logic.

From the foregoing, it will be seen that I have provided a novel timing circuit for producing a precisely timed cyclic sequence of control signals suitable for governing the operation of an automatic molding machine for ground meat food products formed on a stick-like handle. My timing circuit is rendered failsafe through actuation of each timing step by the steps preceding it and it locks in once a cycle is begun to complete that cycle unless a malfunction operates interruption of the machine along the way. My timing circuit is also simple, inexpensive, reliable, easy to service should a malfunction occur, and it is readily adaptable through its high sensitivity for use with low current sensing devices such as magnetic reed relays.

I claim:

1. A timing circuit for providing a plurality of different duration control signals in a timed sequence, said timing circuit comprising a flip-flop having first and second stable states of operation,
a first signal control means coupled to said flip-flop and adapted to provide first and second control signals upon activation of said flip-flop to said first stable state and to terminate said first control signal upon activation of said flip-flop to said second stable state,
a second signal control means operable to terminate said second control signal after a predetermined time delay,
a third signal control means providing a third control signal after a predetermined time delay in response to said first control signal,
a fourth signal control means providing a fourth control signal after a predetermined time delay in response to said third control signal, said flip-flop being responsive to one of the aforesaid signal control means to activate said flip-flop to said second stable state, whereby said first, third and fourth control signals are terminated,
and a fifth signal control means providing a fifth control signal after a first predetermined time delay in response to activation of said second stable state of said flip-flop and terminating said fifth control signal after a second predetermined time delay in response to said activation, said fifth signal control means providing a recycle signal to said flip-flop after said second predetermined time delay, whereby said flip-flop is activated by said recycle signal to said first stable state and the cycle of operations is begun again.

2. A timing circuit as described in claim 1, wherein said flip-flop is responsive to said third signal control means to activate said second stable state simultaneously with the production of said third control signal by said third signal control means.

3. A timing circuit as described in claim 1, further comprising a time delay means responsive to said second signal control means to activate said flip-flop to said second stable state a predetermined time delay after said second signal control means terminates said second control signal, said second signal control means being responsive to said third control signal to terminate said second control signal after a predeterminated time delay.

4. A timing circuit as described in claim 3, wherein said flip-flop comprises an OFF RETURN MEMORY logic unit having an "on" input, an "off" input, a "direct" output, and a NOT output, said "direct" output being coupled to said fifth signal control means to initiate said first and second predetermined time delays therein, said NOT output being coupled to said first signal control means to activate same, said "on" input being coupled to the output of said time delay means, and said "off" input being coupled to said fifth signal control means for activation thereby after said second predetermined time delay, whereby activation of said "on" input activates said flip-flop to its second stable state, and activation of said "off" input activates said flip-flop to its first stable state.

5. A timing circuit as described in claim 4, wherein said second signal control means comprises a TIME DELAY logic unit and a two-input AND logic unit, said TIME DELAY logic unit having an input, a "direct" output, and a NOT output, said NOT output being coupled to one input of said AND logic unit, said "direct" output being coupled to the input of said time delay means for activation of same, the other input of said AND logic unit being coupled to said first signal control means for reception of the first control signal therefrom, said input of said TIME DELAY logic unit being coupled to said third signal control means for reception of said third control signal, the output of said AND logic unit being said second control signal, and said fifth signal control means comprises a first TIME DELAY logic unit having an input and a direct output, a second TIME DELAY logic unit having an input, a "direct" output, and a NOT output, and a two-input AND logic unit, the inputs of said first and second TIME DELAY logic units being coupled to said "direct" output of said OFF RETURN MEMORY logic unit, the "direct" output of said first TIME DELAY logic unit being coupled to one input of said AND logic unit, the NOT output of said second TIME DELAY logic unit being coupled to the other input of said AND logic unit, the output of said AND logic unit being the fifth control signal, and the "direct" output of said second TIME DELAY logic unit being coupled to said "off" input of said OFF RETURN MEMORY logic unit, whereby said first TIME DELAY logic unit triggers initiation of said fifth control signal, and said second TIME DELAY logic unit triggers termination of said fifth control signal and activates said flip-flop to said first stable state.

6. A timing circuit as described in claim 5, wherein said first signal control means comprises a SEALED AND logic unit having a sealed input and an unsealed input, said unsealed input being coupled to the NOT output of said OFF RETURN MEMORY logic unit, said sealed input being available for starting and stopping operation of the timing circuit, the output of said SEALED END logic unit being said first control signal, said third signal control means comprises a TIME DELAY logic unit having an input and an output, said input being coupled to the output of said first signal control means for reception of said first control signal therefrom, said output of said TIME DELAY logic unit being said third control signal, said fourth signal control means comprises a TIME DELAY logic unit having an input and an output, said input being coupled to said third signal control means for reception of said third control signal therefrom, said output of said TIME DELAY logic unit being said fourth control signal, and said time delay means comprises a TIME DELAY logic unit having an input and an output, said input being coupled to said "direct" output of said TIME DELAY logic unit in said second signal control means, and said output being coupled to said "on" input of said OFF RETURN MEMORY logic unit.

7. A timing circuit for providing a plurality of control signals in a predetermined time sequence, said circuit comprising a flip-flop circuit having two stages, each of said stages being a stable state of operation;

a first switch means, said first switch means being coupled to one stage of said flip-flop to close in response to the triggering of said one stage, the closing of said first switch means generating a first control signal;

a first and second time delay switch means having adjustable time delays, said first time delay switch means being coupled to the other stage of said flip-flop circuit to open in response to the triggering of said one stage, said second time delay switch means being coupled to said first switch means to open in response to the closing of said first switch means, the opening of said first time delay switch means generating a second control signal;

a second switch means, said second switch means being coupled to said first switch means to open after a preset time delay in response to the closing of said first switch means, said second switch means in addition being coupled to the other stage of said flip-flop to trigger said other state in response to the opening of said second switch means;

a third switch means, said third switch means being coupled to said first time delay switch means, said third switch means closing in response to the opening of said first time delay switch means to generate a third control signal;

said first time delay switch means closing in response to the triggering of the other stage of said flip-flop, the closing of said first time delay switch means opening said third switch means after a preset time delay and terminating the third control signal;

a fourth switch means, said fourth switch means being coupled to said first switch means to close in response to the closing of said first switch means;

and a fifth switch means, said fifth switch means being coupled to said third switch means to open after a preset time delay in response to the closing of said third switch means, the opening of said fifth switch means generating a fourth control signal;

said first switch means opening in response to the opening of said third switch means, the opening of said first switch means closing said second time delay switch means after a preset time delay and opening said fourth switch means, the opening of said fourth switch means generating a fifth control signal, the closing of said second time delay switch means terminating said fifth control signal and providing a re-set to trigger said one stage of said flip-flop.

8. The circuit of claim 7 wherein said flip-flop comprises a pair of interconnected relays and said second, third, fourth and fifth switch means comprise time delay relays.

9. A timing circuit for providing a plurality of different duration control signals in a time sequence, said circuit comprising a flip-flop circuit having two stages, each of said stages being a stable state of operation;

a first control element having two positions, said first control element being coupled to one stage of said flip-flop to generate a first control signal when moved to one of said positions by triggering of said one stage;

a second control element having two positions, said second control element being coupled to the other stage of said flip-flop to generate a second control signal when moved to one of said positions by the triggering of said one stage of said flip-flop;

a third control element, said third control element being coupled to said first control element to generate a trigger signal for the other stage of said flip-flop a preset time after said first control element is moved to said one position;

a fourth control element having two positions, said fourth control element being coupled to said first and second control elements to generate a third control signal when said other stage of said flip-flop is triggered;

said second control element moving to the other of its two positions a preset delay period after said other stage of said flip-flop is triggered, said second control element terminating said second control signal when said second control element moves to the other of its two positions;

said fourth control element moving to the other of its two positions a preset time after said second control element moves to the other of its two positions, said fourth control element terminating said third control signal when said fourth control element moves to the other of its two positions;

a fifth control element having two positions, said fifth control element being coupled to said fourth control element to generate a fourth control signal a preset delay period after said fourth control element is moved to said one position in response to said triggering of said other stage of said flip-flop, said fifth control element terminating said fourth control signal when said fourth control element moves to said other position;

a sixth control element, said sixth control element being coupled to said first control element, said first control element moving to the other of its two positions to terminate said first control signal when said fourth control element moves to the other of its two positions, said sixth control element generating a fifth control signal when said first control element moves to the other of its two positions;

and a seventh control element, said seventh control element being coupled to said sixth control element to terminate said fifth control signal a preset time after said first control element moves to the other of its two positions.

References Cited

UNITED STATES PATENTS 3,028,552 4/1962 Hahs _______________ 328—74 X
3,213,486 10/1965 Blake _______________ 17—1

LUCIE LAUDENSLAGER, *Primary Examiner.*